April 22, 1924.
R. A. CUMMINGS, JR
1,491,033
AUTOMOBILE SIGNAL LAMP
Filed March 10, 1923    2 Sheets-Sheet 1
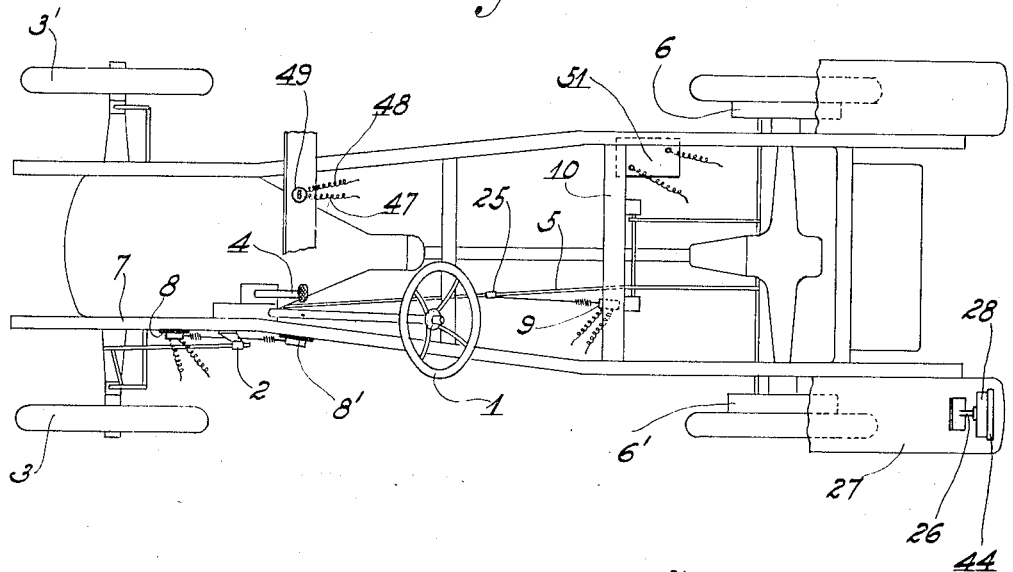
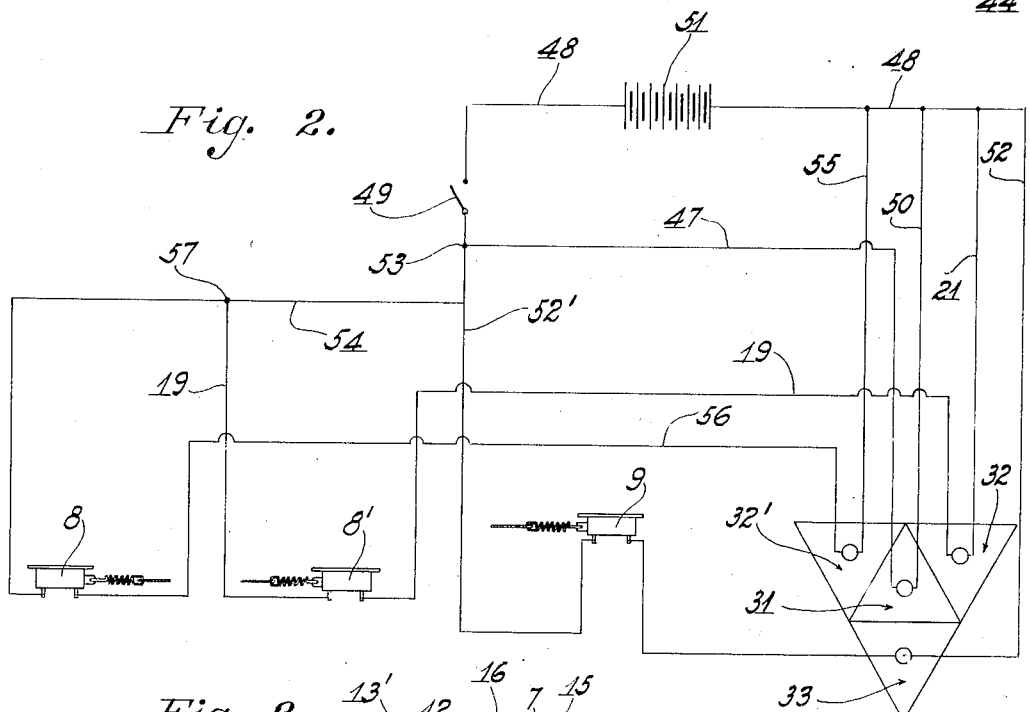

April 22, 1924.
R. A. CUMMINGS, JR
1,491,033
AUTOMOBILE SIGNAL LAMP
Filed March 10, 1923
2 Sheets-Sheet 2
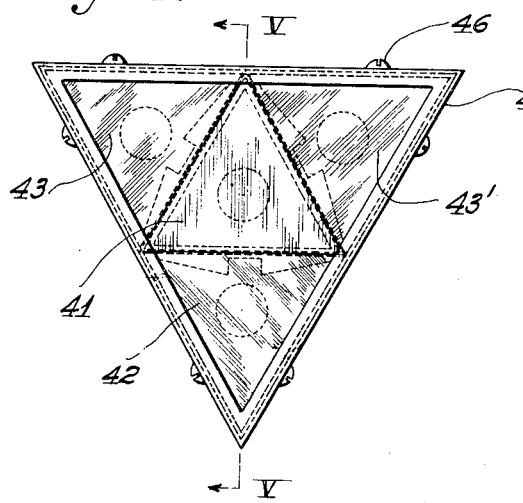
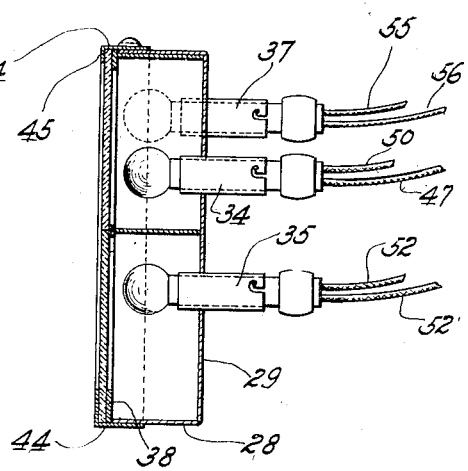
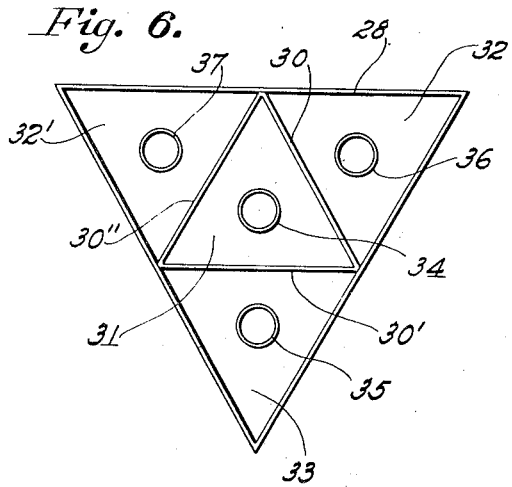
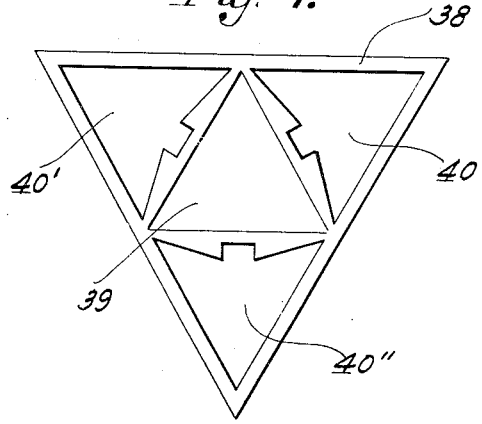
WITNESSES
INVENTOR Patented Apr. 22, 1924.

1,491,033

UNITED STATES PATENT OFFICE.

ROBERT A. CUMMINGS, JR., OF PITTSBURGH, PENNSYLVANIA.

AUTOMOBILE SIGNAL LAMP.

Application filed March 10, 1923. Serial No. 624,121.

*To all whom it may concern:*

Be it known that I, ROBERT A. CUMMINGS, Jr., a citizen of the United States, and a resident of Pittsburgh, in the county of Allegheny and State of Pennsylvania, have invented a new and useful Improvement in Automobile Signal Lamps, of which the following is a specification.

This invention relates to automobile signals, and particularly to a combined tail light and direction indicator for showing the intended movement of the automobile or other vehicle upon which it is mounted.

An object of the invention is to provide improved forms of signaling devices from which an intention to stop or to turn either toward the right or the left will be indicated automatically and without any special thought or effort on the part of the driver of the vehicle.

It is a special object to provide a signaling system in which substantially all the actuating elements are rigidly mounted upon the frame of the chassis and out of sight whereby to avoid an unsightly appearance, and without detracting from the sensitiveness of operation.

It is another special object to provide an extremely sensitive system, that is, one in which the several signaling lights will respond to but a slight turning movement of the vehicle either toward the right or the left and in which a continued or extreme degree of turning movement will not throw heavy or undue strains upon the parts. It is also a special object to provide a system in which the signaling lights will remain illuminated until the vehicle has returned to its normal straight-ahead position.

Still further special objects are to provide a signaling device comprising a plurality of associated light compartments, so shaped, arranged, colored and disposed that the intended movement of the vehicle is readily apparent, and in which the constantly lighted tail light is so associated with the lights for indicating an intention to stop or to turn either to the left or to the right that the latter lights provide heads of indicating arrows formed by the combined tail light and movement-indicating light, and in which each of the arrows so formed will by its distinctive position make apparent the intended movement of the vehicle.

These and other objects of the invention will more fully appear when taken in conjunction with the following description and appended claims.

In the accompanying drawings, Fig. 1 is a view of the chassis of an automobile, showing the installation of one embodiment of the signaling system thereon; Fig. 2, a diagrammatic view illustrating the method of wiring employed in the system; Fig. 3, a fragmentary detailed sectional view, showing one of the contact making devices for completing the electrical circuits of the several movement-indicating lights; Fig. 4, an elevational view showing the relative disposition and arrangement of the several compartments comprising the novel signal-lamp; Fig. 5, a vertical sectional view taken on the line V—V of Fig. 4; Fig. 6, an elevation of the housing for the signal-lamp with the transparent plates and backing disk removed therefrom; Fig. 7, an elevational view of the backing plate used in connection with the cover plates of the lamp for forming the arrow heads used for indicating the intended movements of the vehicle.

In Fig. 1, is illustrated the chassis of an automobile provided with the customary steering mechanism controlled from the steering wheel 1 the turning of which in either direction causes oscillation of the crank arm 2, the latter being operatively connected in any suitable manner for moving the front wheels 3, 3', in a well known fashion. Turning of the steering wheel 1 clockwise, as viewed in Fig. 1, for forcing the vehicle to curve toward the right causes the crank arm 2 to move in one direction, while turning of the steering wheel anti-clockwise for forcing the vehicle to curve toward the left in turn causes the crank arm 2 to move in the opposite direction. The chassis is also equipped with the usual service brake mechanism which is controlled by actuation of the brake pedal 4 operatively connected by means of the brake rod 5 to the customary parts for regulating the frictional contact with the brake drums 6, 6'.

Rigidly mounted upon the side frame member 7 of the chassis and disposed at opposite sides of the crank arm 2, are a pair of switches indicated at 8, 8', a similar switch 9 being likewise mounted upon the transverse frame member 10. These several switches are identical in construction, consequently but one of them need be described in detail. The switch consists of a housing 11 open at its bottom and provided with apertured laterally extending flanges 12, 12' serving as a means for attaching the housing in place, the same being usually anchored by means of bolts such as indicated at 13, 13', which are passed through the apertures in the said flanges. The opposite sides of the housing 11 are provided with aligned openings through which a longitudinally movable rod 14 projects and is guided thereby. Attached to the intermediate portion of the rod 14 and disposed within the interior of the housing is a collar 15 made of insulating material, a coiled spring 16 being interposed between the collar and one end of the housing for constantly urging the rod to move in one direction, for instance toward the right as viewed in Fig. 3. The collar 15 is adapted to abut a bent resilient finger 17, functioning to bridge the terminal contacts of the switch, fixed to the closed top of the housing by means of a binding post 18 to the outer end of which one of the electrical conductors 19 is attached. The free end of the finger 17 overlies the inner portion of a binding post 20 similar to the post 18 to which the conductor 21 is attached.

With the parts in the position shown in Fig. 3, the free end of the finger 17 is out of contact with the post 20, but due to the shape of the said finger and the abutment therewith of the collar 15, sliding movement of the rod 14 towards the left causes contact of the finger with the post 20 completing the electrical circuit through the conductors 19—21. The opposite ends of the rod 14 are provided with the apertures 22, 22' for engagement with one end of the coiled extension spring 23, the opposite end of which is attached to the cable 24. With the arrangement of the several switches, as shown in Fig. 1, the cables 24 leading from the switches 8, 8', are attached to any suitable portion of the crank arm 2, while the cable extending from the switch 9 is attached to the brake rod 5 at any suitable point such as indicated at 25. In any event, pulling upon the cable 24 in a direction away from the housing of the switch results in a movement of the switch parts to complete the circuit through the electrical conductors associated therewith, and the provision of the extension spring 23 permits a continued movement of the cable 24 after the switch has been moved to closed condition without throwing excessive or undue strains upon the parts.

The signaling-light used in connection with this invention is preferably mounted upon a bracket 26 attached to the left hand rear fender 27 of the vehicle. The signal-light proper comprises a main housing 28 which is triangular in shape and is disposed in position upon the vehicle with its top side in a substantially horizontal plane, that is, in the position illustrated in Figs. 4 to 7 of the drawings. The housing 28 is provided with a closed back 29, being open at its front face. The interior of the housing is equipped with partitions 30, 30', 30'', extending between the mid-points of the three sides of the housing, dividing the housing into a plurality of triangular compartments, namely, a central compartment 31 and three corner compartments 32, 32' 33, the corner compartments corresponding to the three corners of the main housing. Mounted in each compartment and supported by the back wall 29 are a plurality of electric lamp sockets 34—37. One of these sockets is provided for each of the compartments, is located about the middle thereof, and is equipped with an ordinary electric lamp. These sockets are of a well known commercial type adapted to receive at their outer extremities plugs from which lead the electrical conductors furnishing the supply of electricity for lighting purposes.

Superposed upon the open face of the housing 28 is a backing disk 38 corresponding in outline to that of the housing. This backing disk is provided with a plurality of openings formed therein corresponding in number and relative positions to the several compartments of the housing, that is, with a central opening 39, and with three corner openings 40, 40', 40''. The central opening 39 is triangular in shape and corresponds substantially to the open end of the central compartment 31, while the corner openings 40, 40', 40'' are in the form of arrow heads as clearly shown in Fig. 7, the bases of the heads being formed by the configuration of the portions of the disk surrounding the central opening 39, and the arrow heads pointing away from the said central opening. Overlying the backing disk 38 and covering the entire open face of the housing 28 are a plurality of triangular transparent plates 41, 42, 43, 43', the open end of each compartment being covered by one of these plates, and the adjacent edges of the several plates abutting so as to form a covering for the entire housing, as clearly shown in Figs. 4 and 5. These transparent plates are held in operative position by means of an apertured retaining frame 44 which is adapted to telescopically engage and fit around a portion of the periphery of the housing 28, the retaining frame being equipped with an inturned marginal flange 45 contacting the transparent plates so as to retain them in contact with the backing disk 38, and the several parts in proper abutting relation with the housing. The inner edge of the marginal flange 45 and edges of the corner openings in the backing disk are coincident with each other. The retaining frame may be anchored to the housing in any desired manner, preferably by means of screw bolts such as indicated at 46.

The electrical connections provided for the several circuits leading to the respective lamps mounted in the compartments of the housing 28 can be best understood from an inspection of the diagrammatic showing in Fig. 2 of the drawings. Electrical conductors 47, 48 lead from the terminals of a master controlling switch 49 preferably mounted upon the dash of the vehicle, the conductors 47, 48, 50 serving to complete the circuit of the lamp located in the central compartment 31, and interposed in this circuit is any desirable source of supply of electricity such as a storage battery indicated at 51, in practice mounted underneath and at one side of the chassis. Attached to the conductor 48 is a conductor 52 which in conjunction with the conductor 52', connected to the conductor 47 at 53, serve to complete the circuit of the lamp located in compartment 33, and interposed in this circuit is the switch 9. A conductor 21 leading from conductor 48 in conjunction with the conductors 19 and 54, serve to complete the circuit of the lamp located in compartment 32 and interposed in this circuit is the switch 8'. Likewise, a conductor 55 in conjunction with the conductor 56 attached to the conductor 54 at 57 serve to complete the circuit to the lamp located in compartment 32', in which circuit is interposed the switch 8. It is thus seen that upon closure of the master switch 49, the circuit for the lamp of compartment 31 is completed, while in order to complete the circuits for any of the remaining lamps it is necessary to move the interposed switches 8, 8', 9 to closed condition but due to the type of switch employed, the circuit of these lamps normally remain open. Although special control switches are not interposed in the circuits leading to the several lamps of the corner compartments, such may be used if desired, so as to positively maintain such circuits open should the same be found desirable.

The transparent plates provided for the several compartments of the housing are distinctively colored, for instance, the plate 41 is colored red so that when the lamp of the central compartment is lighted, it will serve the purposes of the ordinary tail light required upon motor-vehicles, while the plate 42 is green, and the plates 43, 43' are purple. Although the colors of the plates 42, 43, 43' have been especially selected, as indicated, it is to be understood that any other distinctive colors may be chosen to serve the purpose to be subsequently described.

From the above description, the operation of the system will be obvious. Whenever the master switch 49 is moved to its closed position so as to complete the circuit to the lamp in the central compartment 31, said lamp will be constantly lighted so as to function as an ordinary tail light customarily required upon motor vehicles. Whenever the brake pedal 4 is depressed to move the same into operative position, a pull will be exerted upon the cable 24 of switch 9, causing said switch to be moved to its closed condition, in which event the electrical circuit to the lamp in compartment 33 will be closed. The lighting of the green signal light, together with the arrow head associated therewith pointing downwardly toward the ground, effectively warns the driver of a vehicle following the one equipped with this invention that there is an intention to either slow down or stop. Should the steering wheel 1 be moved clockwise so as to turn the vehicle toward the right, the oscillation of the crank arm 22 will exert a pull upon the cable 24 associated with the switch 8', thereby completing the circuit to the lamp in compartment 32 causing the purple signal light therein to be illuminated. Likewise turning of the steering wheel toward the left exerts a pull upon the cable associated with the switch 8, illuminating the purple signal light in compartment 32'.

As shown by the arrangement illustrated in Figs. 4 and 6, the compartment 32 appears upon the right to a following observer, and the arrow head associated therewith also points toward the right serving to clearly indicate an intention to turn in that direction. Similarly, the location of the compartment 32' on the left and the direction in which the arrow head associated therewith points, unambiguously conveys the intention of turning toward the left. Since the light in the central compartment 31 remains at all times in lighted condition, regardless of which one of the corner compartments is illuminated, the central compartment co-operates with either of the lighted corner compartments to form a signaling arrow indicating the movement of the vehicle to the observer at the rear, the light in the corner compartment serving to furnish the arrow head for the direction indicating signal.

It is thus seen that the invention provides a signaling system which is automatic in operation, requiring no thought or effort on the part of the operator after once being set to operative condition by the closure of the master switch. Furthermore, it is particularly pointed out that the system is extremely sensitive, due to the fact that a slight movement of either the steering mechanism or the service brake will immediately effect a closure of the switches 8, 8', 9 to cause the signal light to be exhibited. This, however, in no way interferes with the continued movement of the steering mechanism or service brake, since the elongation of the extension spring 23 permits such action without throwing undue or excessive strains upon the switch devices, these switches remaining in their closed condition with the proper signal lights exhibited until the service brake has been released to its normal position, or the steering mechanism has been turned to cause the vehicle to resume movement in its usual straight ahead direction.

The signaling system comprising the invention is extremely simple in construction, economical to manufacture, easy to install either upon vehicles already in use or as part of their original initial equipment, and all the parts are rigidly mounted upon firm supports and out of view so as to avoid an unsightly appearance.

I claim:

1. A signaling device comprising a housing triangular in shape having one of its sides disposed substantially in a horizontal plane, partitions in said housing dividing the same into a plurality of similarly shaped compartments, the face of each compartment being equipped with a transparent plate, an opaque disk corresponding in outline to the housing provided with openings overlying said compartments, each of the openings disposed at the corners of the disk being in the shape of arrow heads, and a source of light in each of the compartments.

2. A signaling device comprising a housing triangular in shape having one of its sides disposed substantially in a horizontal plane, said housing being open at one end, partitions joining the middle points of the sides of the housing and dividing the same into a central compartment and three corner compartments, the open end of each compartment being covered with a distinctively colored transparent plate, an opaque backing disk corresponding in outline to that of the housing interposed between the transparent plates and the compartments, said backing disk being provided with an opening overlying each of the compartments, the central opening corresponding in shape to that of the central compartment and the corner openings being in the shape of arrow heads with the points directed away from the central compartment, and a source of light in each of the compartments.

3. A signaling device comprising a housing triangular in shape having one of its sides disposed substantially in a horizontal plane, said housing being open at one end, partitions joining the middle points of the sides of the housing and dividing the same into a central compartment and three corner compartments, the open end of each compartment being covered with a distinctively colored transparent plate, an opaque backing disk corresponding in outline to that of the housing interposed between the transparent plates and the compartments, said backing disk being provided with an opening overlying each of the compartments, the central opening corresponding in shape to that of the central compartment and the corner openings being in the shape of arrow heads with the points directed away from the central compartment, an apertured retaining frame fixed to the housing having an inturned marginal flange contacting said transparent plates whereby to position the same, the inner edge of said marginal flange being coincident with the edges in the corner openings of the backing disk, and a source of light in each of the said compartments.

In testimony whereof, I sign my name.

ROBERT A. CUMMINGS, Jr.

Witness:
EDWIN O. JOHNS.